(12) United States Patent
Soldagg et al.

(10) Patent No.: US 12,473,021 B2
(45) Date of Patent: Nov. 18, 2025

(54) CONTROL DEVICE AND METHOD FOR CONTROLLING A TAG AXLE STEERING SYSTEM

(71) Applicant: Scania CV AB, Södertälje (SE)

(72) Inventors: Lars Soldagg, Gnesta (SE); Christofer Öman, Nykvarn (SE)

(73) Assignee: Scania CV AB, Södertälje (SE)

(*) Notice: Subject to any disclaimer, the term of this patent is extended or adjusted under 35 U.S.C. 154(b) by 113 days.

(21) Appl. No.: 18/282,881

(22) PCT Filed: Mar. 23, 2022

(86) PCT No.: PCT/SE2022/050276
§ 371 (c)(1),
(2) Date: Sep. 19, 2023

(87) PCT Pub. No.: WO2022/216199
PCT Pub. Date: Oct. 13, 2022

(65) Prior Publication Data
US 2024/0166257 A1    May 23, 2024

(30) Foreign Application Priority Data
Apr. 8, 2021 (SE) .................. 2150434-5

(51) Int. Cl.
*B62D 6/00* (2006.01)
*B62D 5/04* (2006.01)
(Continued)

(52) U.S. Cl.
CPC .......... *B62D 6/002* (2013.01); *B62D 5/0481* (2013.01); *B62D 7/144* (2013.01); *B62D 7/148* (2013.01);
(Continued)

(58) Field of Classification Search
None
See application file for complete search history.

(56) References Cited

U.S. PATENT DOCUMENTS 4,824,135 A * 4/1989 McGregor ............. B62D 13/04
280/400
5,607,028 A * 3/1997 Braun .................. B62D 7/1509
180/408
(Continued)

FOREIGN PATENT DOCUMENTS

AT        506237 A1 *  7/2009 ........... B62D 13/025
AT        506237 B1 * 10/2009 ........... B62D 13/025
(Continued)

OTHER PUBLICATIONS

Scania CV AB, International Patent Application No. PCT/SE2022/050276, International Search Report, Jun. 23, 2022.
(Continued)

*Primary Examiner* — Kevin R Steckbauer
(74) *Attorney, Agent, or Firm* — Moore & Van Allen PLLC; W. Kevin Ransom (57) ABSTRACT

A control device and method for controlling a tag axle steering system, configured to steer tag axle wheels of a tag axle, are provided. The method comprises, when the steering angle of the tag axle wheels is offset from a steering angle of a neutral position of the tag axle wheels and in response to a fault signal indicating malfunction of the tag axle steering system, locking the position of the tag axle wheels at a current steering angle of the tag axle wheels. A computer program and a computer-readable medium, as well as a vehicle, are also disclosed.

13 Claims, 4 Drawing Sheets

(51) Int. Cl.
  *B62D 7/14* (2006.01)
  *B62D 7/15* (2006.01)
  *B62D 12/00* (2006.01)
  *B62D 13/00* (2006.01)
  *B62D 13/02* (2006.01)
  *B62D 13/04* (2006.01)

(52) U.S. Cl.
  CPC ............ *B62D 7/159* (2013.01); *B62D 13/04* (2013.01); *B62D 12/00* (2013.01); *B62D 13/005* (2013.01); *B62D 13/025* (2013.01)

(56) References Cited

U.S. PATENT DOCUMENTS

| | | | | |
|---|---|---|---|---|
| 6,450,285 | B1 * | 9/2002 | Horwath | B62D 7/144 180/404 |
| 7,637,512 | B1 * | 12/2009 | McGhie | B60P 1/54 280/411.1 |
| 10,604,183 | B2 * | 3/2020 | Stratmann | B60W 30/02 |
| 11,166,403 | B2 * | 11/2021 | Dockter | A01B 49/00 |
| 2007/0089916 | A1 * | 4/2007 | Lundstrom | B60K 7/0007 180/6.48 |
| 2007/0126196 | A1 * | 6/2007 | Klahn | B62D 53/005 280/404 |
| 2007/0169969 | A1 * | 7/2007 | Hummel | B62D 7/144 180/418 |
| 2007/0216134 | A1 * | 9/2007 | Padula | B62D 13/025 280/443 |
| 2009/0273159 | A1 * | 11/2009 | Sutton | B60G 3/06 280/124.157 |
| 2013/0257016 | A1 * | 10/2013 | Orgeron | B62D 12/00 280/442 |
| 2015/0321696 | A1 * | 11/2015 | Jang | B62D 7/148 701/43 |
| 2017/0217482 | A1 * | 8/2017 | Eckmann | B62D 5/064 |
| 2018/0194394 | A1 * | 7/2018 | Stratmann | B62D 15/025 |
| 2019/0124820 | A1 * | 5/2019 | Dockter | A01B 49/00 |
| 2024/0166257 | A1 * | 5/2024 | Soldagg | B62D 7/159 |

FOREIGN PATENT DOCUMENTS

| | | | | |
|---|---|---|---|---|
| AT | 524355 | A4 * | 5/2022 | ............ B62D 13/04 |
| CH | 648251 | A5 * | 3/1985 | ............ B62D 7/144 |
| DE | 10245618 | A1 | 4/2004 | |
| DE | 102012105976 | A1 * | 1/2014 | ............ B62D 7/148 |
| DE | 102012107777 | A1 | 5/2014 | |
| DE | 102016103720 | A1 * | 9/2016 | ............ B62D 13/04 |
| DE | 102017005456 | A1 * | 12/2017 | ............ B62D 13/00 |
| DE | 102018116935 | A1 * | 1/2019 | ............ B62D 7/159 |
| DE | 102017005456 | B4 * | 8/2021 | ............ B62D 13/00 |
| DE | 102013002565 | B4 * | 12/2022 | ............ B62D 5/06 |
| DE | 112022004489 | T5 * | 8/2024 | ............ B62D 7/148 |
| DE | 102015007680 | B4 * | 11/2024 | ............ B62D 61/12 |
| EP | 1215104 | A1 * | 6/2002 | ............ B62D 61/10 |
| EP | 2072375 | A2 * | 6/2009 | ........ B62D 13/025 |
| EP | 2072375 | B1 * | 3/2011 | ........ B62D 13/025 |
| EP | 2981448 | B1 * | 9/2018 | ............ B62D 7/148 |
| EP | 3483039 | A1 * | 5/2019 | ............ B62D 7/144 |
| EP | 3483039 | B1 * | 3/2021 | ............ B62D 7/144 |
| EP | 4446201 | A1 * | 10/2024 | ............ B62D 13/04 |
| FI | 126576 | B * | 2/2017 | ............ A01B 69/004 |
| GB | 2446631 | A * | 8/2008 | ............ B62D 61/08 |
| GB | 2495940 | A * | 5/2013 | ............ B62D 13/04 |
| JP | 62139756 | A | 6/1987 | |
| SE | 1650840 | A1 * | 12/2017 | ......... B62D 13/025 |
| SE | 541254 | C2 * | 5/2019 | ............ B62D 7/159 |
| SE | 541383 | C2 * | 9/2019 | ............ B62D 7/159 |
| SE | 2151143 | A1 * | 3/2023 | ............ B62D 13/06 |
| SE | 545191 | C2 * | 5/2023 | ............ B62D 13/06 |
| SE | 545455 | C2 * | 9/2023 | ............ B62D 13/04 |
| SE | 2251013 | A1 * | 3/2024 | ............ B62D 7/144 |
| WO | WO-9957001 | A1 * | 11/1999 | ............ B62D 7/144 |
| WO | WO-2006005124 | A1 * | 1/2006 | ............ B62D 13/00 |
| WO | WO-2007128073 | A1 * | 11/2007 | ............ B62D 13/005 |
| WO | WO-2009019444 | A1 * | 2/2009 | ............ B62D 13/025 |
| WO | WO-2010114427 | A1 * | 10/2010 | ............ B60K 6/52 |
| WO | WO-2010141962 | A1 * | 12/2010 | ......... B62D 13/025 |
| WO | WO-2011115487 | A1 * | 9/2011 | ............ B62D 13/06 |
| WO | WO-2014023506 | A1 * | 2/2014 | ............ B62D 7/144 |
| WO | WO-2014029555 | A1 * | 2/2014 | ............ B62D 7/144 |
| WO | WO-2014163560 | A1 * | 10/2014 | ............ B62D 7/148 |
| WO | WO-2015060752 | A1 * | 4/2015 | ............ B62D 12/00 |
| WO | WO-2016200311 | A1 * | 12/2016 | ............ B62D 7/159 |
| WO | WO-2016200313 | A1 * | 12/2016 | ............ B62D 7/159 |
| WO | WO-2019072379 | A1 * | 4/2019 | ...... B60W 30/18145 |
| WO | WO-2022144094 | A1 * | 7/2022 | ............ B60L 3/10 |
| WO | WO-2022183233 | A1 * | 9/2022 | ............ B62D 13/04 |
| WO | WO-2022216199 | A1 * | 10/2022 | ............ B62D 7/159 |
| WO | WO-2023043356 | A1 * | 3/2023 | ............ B62D 13/06 |
| WO | WO-2024246539 | A2 * | 12/2024 | ............ B62D 13/04 |
| WO | WO-2024251625 | A1 * | 12/2024 | ............ B62D 7/159 |

OTHER PUBLICATIONS

Scania CV AB, International Patent Application No. PCT/SE2022/050276, Written Opinion, Jun. 23, 2022.
Scania CV AB, Swedish Patent Application No. 2150434-5, Office Action, Nov. 16, 2021.
Scania CV AB, International Patent Application No. PCT/SE2022/050276, International Preliminary Report on Patentability, Oct. 10, 2023.

* cited by examiner

CONTROL DEVICE AND METHOD FOR CONTROLLING A TAG AXLE STEERING SYSTEM

CROSS-REFERENCE TO RELATED APPLICATIONS

This application is a National Stage Patent Application (filed under 35 § U.S.C. 371) of PCT/SE2022/050276, filed Mar. 23, 2022, of the same title, which, in turn claims priority to Swedish Patent Application No. 2150434-5 filed Apr. 8, 2021, of the same title; the contents of each of which are hereby incorporated by reference.

TECHNICAL FIELD

The present disclosure relates in general to a method for controlling a tag axle steering system. The present disclosure further relates in general to a control device configured to control a tag axle steering system. The present disclosure further relates in general to a computer program and a computer-readable medium. Moreover, the present disclosure relates in general to a vehicle.

BACKGROUND

Vehicles adapted to transport heavy loads, such as trucks, semis, buses, dumpers, haulers, trailers, often exert large pressure on the ground as a result of their weight, especially when transporting a load. To handle this pressure, such vehicles may often comprise one or more tag axles, each comprising a pair of tag axle wheels. This decreases the pressure each wheel of the vehicle has to transfer to the ground.

A tag axle is an unpowered, i.e. non-driven, axle, and may be arranged at various positions in the vehicle. A tag axle arranged in front of a driven axle, when seen in the primary direction of travel of the vehicle, is often referred to as a pusher axle or a pusher tag axle. A tag axle arranged behind the driven axle is often referred to as a trailing axle or trailing tag axle. The tag axle may often be liftable to enable raising the tag axle wheels from the ground when not needed, for example when the vehicle carries no load.

In order to improve maneuverability of the vehicle, the tag axle may be a steerable tag axle. This means that the tag axle wheels may be steered. Thereby, it is for example possible to obtain a more appropriate turning radius of the vehicle. Furthermore, the ability to steer tag axle wheels may also reduce the tyre wear of the tag axle wheels. The steering of the tag axle wheels may be performed in dependence of the steering of the front wheels of the vehicle. Generally, the steering of the tag axle may be based on the steering angle of the steering wheel. However, the possibility to steer the tag axle has certain limitations and can (at least in case the steerable tag axle is not capable of self-centering) for safety reasons in practice only be used up to a certain vehicle speed, for example up to about 30 km/h or about 40 km/h depending on the vehicle configuration. For example, if a failure of the tag axle steering system would occur at high vehicle speeds, there will be a loss in the maneuverability of the vehicle (especially if the tag axles wheels are not aligned with the longitudinal direction of the vehicle and at heavy vehicle loads) which in turn obviously could have detrimental effects. Therefore, when the vehicle speed is higher than the above-described vehicle speed, the tag axle steering system is generally deactivated with the tag axle wheels locked in a neutral position in which they are aligned with the longitudinal extension of the vehicle.

WO 2014/163560 A1 discloses a system for steering at least one unpowered wheeled tag axle of a vehicle which in the vehicle's ordinary direction of movement follows the front axle. The system comprises an ancillary unit adapted, if the vehicle's speed is below a threshold speed when a malfunction of the system occurs, to switching the system to a first fail-safe state with caster steering of the tag axle, but if the vehicle is above the threshold speed when a malfunction of the system occurs, to keeping the tag axle locked with its wheels in a fixed neutral position aligned with the vehicle's longitudinal direction in a second fail-safe state of the system.

SE 1650840 A1 discloses an articulated vehicle comprising an articulation joint and an articulation joint sensor member configured to measure at least one articulation parameter representing the articulation state of the articulation joint. The vehicle further comprises a steerable tag axle controlled by a tag axle control unit. The tag axle control unit is configured to receive an articulation signal generated by the articulatio joint sensor member, analyze articulation parameter value(s) in relation to a set of vehicle control rules, and to determine tag axle steering commands in dependence of the result of the analysis.

SUMMARY

The object of the present invention is to increase the safety in the operation of a vehicle in case of malfunction of a tag axle steering system of a steerable tag axle of the vehicle.

The object is achieved by the subject-matter of the appended independent claim(s).

In accordance with the present disclosure, a method for controlling a tag axle steering system is provided. The method is performed by a control device. The tag axle steering system is configured to steer tag axle wheels of a tag axle in dependence of information obtained from a front axle steering system of a vehicle and/or an articulation control system of the vehicle, wherein said front axle steering system is configured to steer front wheels of the vehicle, and wherein said articulation control system is configured to monitor and/or control at least one articulation parameter representing an articulation state of the vehicle. The method comprises, when the steering angle of the tag axle wheels is offset from a steering angle of a neutral position of the tag axle wheels and in response to a fault signal indicating malfunction of the tag axle steering system, locking the position of the tag axle wheels at a current steering angle of the tag axle wheels.

If the steering angle of the tag axle wheels is offset from the steering angle of the neutral position, the vehicle is likely currently turning. By locking the tag axle wheels in the current position (i.e. in the position of the current steering angle of the tag axle wheels) in case of a fault signal indicating malfunction of the tag axle steering system, the risk of an unwanted oversteering behavior may be avoided when the vehicle is turning. Thereby, a safe failure mode is achieved.

Furthermore, since the method increases the safety in the maneuverability of the vehicle in case of malfunction of the tag axle steering system, it may also enable allowing the tag axle steering system to be used at higher vehicle travelling speeds than currently considered allowable. This may in turn for example reduce the tyre wear of tag axle wheels.

The method may further comprise, when it is determined that a predefined condition is fulfilled while the position of the tag axle wheels is locked at said current steering angle of the tag axle wheels, releasing the tag axle wheels to a caster steer mode. Thereby, the tag axle wheels may straighten up, by the forces to which they are subjected, so as to approach a neutral position. This in turn reduces the risk of the vehicle getting a skew on the back when the vehicle is no longer turning or only turning slightly, and therefore further increases the safety.

The method may further comprise, in response to a determination that the steering angle of tag axle wheels have reached a steering angle of the neutral position while the tag axle wheels are in caster steer mode, locking the position of tag axle wheels in the neutral position. This in turn increases the safety further since having the tag axle wheels locked in the neutral position is the safest failure mode, and allows a driver to predict the vehicle behavior.

The predefined condition may be that at least one predefined parameter, obtained from the front axle steering system of the vehicle and/or sensors of the wheels of the vehicle, fulfils a predefined criterion for said predefined parameter. Thereby, it may be determined that the vehicle is no longer turning, or at least not turning as much as before, and that the tag axle wheels therefore may safely be released to caster steer mode in order to allow them to approach the neutral position.

The predefined parameter may be a parameter reflecting the steering angle, or rate of change of the steering angle, of the front wheels. In such a case, the predefined criterion may be that the predefined parameter reflects that the steering angle, or rate of change of the steering angle, of the front wheels is within a predefined interval. Thereby, the accuracy in determining the turning state of the vehicle may be increase, which in turn increases the safety of the method and thereby the maneuverability of the vehicle.

The predefined parameter may be a steering wheel angle, a steering wheel angular velocity, a steering column torque, a rate of change of steering column torque, a steering angle of the front wheels, or a difference in rotational speed between the wheels of a wheel pair (such as the front wheels) of the vehicle. Thereby, an accurate and easy determination of the turning state of the vehicle may be achieved.

Locking the position of the tag axle wheels at the current steering angle of the tag axle wheels may be performed when the steering angle of the tag wheels is offset from the steering angle of the neutral position by a value exceeding a predefined threshold value. Thereby, it may be avoided that locking in a current position is performed in situations where it instead would be easy to safely and quickly arrive, for example by utilizing caster steer mode directly, at the neutral position such that the tag axle wheels may be locked in said neutral position.

The neutral position of the tag axle wheels corresponds to a position wherein the tag axle wheels are considered to be aligned with a longitudinal axis of the vehicle.

The tag axle steering system may be an electrohydraulic tag axle steering system or an electric tag axle steering system.

The present disclosure also provides a computer program comprising instructions which, when executed by a control device, cause the control device to carry out the method as described above.

The present disclosure also provides a computer-readable medium comprising instructions which, when executed by a control device, cause the control device to carry out the method as described above.

Furthermore, in accordance with the present disclosure, a control device configured to control a tag axle steering system is provided. Said tag axle steering system is configured to steer tag axle wheels of a tag axle in dependence of information obtained from a front axle steering system of a vehicle and/or an articulation control system of the vehicle, wherein said front axle steering system is configured to steer front wheels of the vehicle and wherein said articulation control system is configured to monitor and/or control at least one articulation parameter representing an articulation state of the vehicle. The control device is configured to, when the steering angle of the tag axle wheels is offset from a steering angle of a neutral position of the tag axle wheels and in response to a fault signal indicating malfunction of the tag axle steering system, lock the position of the tag axle wheels at a current steering angle of the tag axle wheels.

The control device provides the same advantages as described above with regard to the corresponding method for controlling a tag axle steering system.

The control device may further be configured to release the tag axle wheels to a caster steer mode in response to a determination that a predefined condition is fulfilled while the position of the tag axle wheels is locked at said current steering angle of the tag axle wheels.

The control device may further be configured to lock the tag axle wheels in the neutral position in response to a determination that the steering angle of tag axle wheels have reached the steering angle of the neutral position while the tag axle wheels are in caster steer mode.

The present disclosure also provides a vehicle comprising a tag axle steering system configured to steer tag axle wheels of a tag axle of the vehicle. The vehicle further comprises the control device described above.

DETAILED DESCRIPTION

The invention will be described in more detail below with reference to exemplifying embodiments and the accompanying drawings. The invention is however not limited to the exemplifying embodiments discussed and/or shown in the drawings, but may be varied within the scope of the appended claims. Furthermore, the drawings shall not be considered drawn to scale as some features may be exaggerated in order to more clearly illustrate the invention or features thereof.

In the present disclosure, a steered or steerable tag axle should be considered to mean to comprise the tag axle including, at least when the vehicle in which the tag axle is fitted is in operation, its tag axle wheels, as well as the tag axle steering system configured to steer the tag axle wheels of said tag axle.

Furthermore, when it is described herein that the tag axle wheels are locked in a position, this means that the tag axle wheels cannot be turned left or right by lateral forces or by the tag axle steering system. In contrast, in a caster steer mode, the tag axle wheels are not in a locked position and are therefore able to turn left or right by the lateral forces they may be subjected to as a result of the vehicle movement. It should however be noted that, in the caster steer mode, the tag axle wheels are not actively steered by the tag axle steering system.

Furthermore, in the present disclosure, the term "neutral position" of the tag axle wheels is used to describe the position of the tag axle wheels, when the tag axle is fitted in a vehicle, wherein the tag axle wheels are, or at least are considered to be, essentially aligned with a longitudinal axis of the vehicle. Such a position may alternatively be described as a centered position. Described differently, the neutral position corresponds to a position that the tag axle wheels would have if the tag axle would be a non-steerable tag axle.

The tag axle steering system discussed in the present disclosure may be a tag axle steering system configured to steer tag axle wheels of a tag axle fitted in any type of land-based vehicle, in particular a heavy vehicle, including for example a truck, a bus, or a trailer. The vehicle may or may not be an articulated vehicle. An articulated vehicle is a vehicle comprising a pivot joint (articulation joint) that allows the vehicle to turn more sharply. Moreover, such a tag axle may be arranged anywhere in the vehicle and may thus be a pusher tag axle or a trailing tag axle. It should also be noted that a vehicle may be fitted with more than one steerable tag axle, if desired.

The present disclosure provides a method for controlling a tag axle steering system. The tag axle steering system is configured to steer tag axle wheels of a tag axle in dependence of information obtained from a front axle steering system of a vehicle, wherein said front axle steering system is configured to steer front wheels of the vehicle. If the tag axle is arranged in an articulated vehicle, the tag axle steering system may additionally or alternatively be configured to steer the tag axle wheels of the tag axle in dependence of information obtained from an articulation control system of the vehicle, wherein said articulation control system is configured to monitor and/or control at least one articulation parameter representing an articulation state of the vehicle. The method comprises, when the steering angle of the tag axle wheels is offset from a steering angle of a neutral position of the tag axle wheels and in response to a fault signal indicating malfunction of the tag axle steering system, locking the position of the tag axle wheels at a current steering angle of the tag axle wheels. More specifically, locking the tag axle wheels in said position may be performed in response to a fault signal indicating malfunction of the tag axle steering system if the steering angle of the tag wheels is offset from the steering angle of the neutral position by a value exceeding a predefined threshold value.

The present method is performed while the tag axle steering system is active. In other words, the method is performed when the tag axle steering system is in use. This means that, at the start of the method, the tag axle wheels are actively steered by the tag axle steering system. This is typically performed at vehicle travelling speeds up to a pre-set threshold vehicle travelling speed. Above said pre-set threshold vehicle travelling speed, the tag axle steering system is instead deactivated and the tag axle wheels kept in the neutral position (independently of any information obtained from a front axle steering system and/or articulation control system). Furthermore, although inherently obvious from the present disclosure, it should also be pointed out that if the tag axle is a raisable tag axle that allows lifting the tag axle wheels from the ground, the method is performed while the tag axle is in a non-raised state. In other words, the tag axle wheels are, during the performance of the present method, in contact with the ground.

When the steering angle of the tag axle wheels is offset from a steering angle of the neutral position of the tag axle wheels, the vehicle in which the tag axle is arranged is likely currently turning. If a malfunction of the tag axle steering system occurs in such a situation, the vehicle may not behave as expected by for example a driver of the vehicle and it may be more difficult to steer the vehicle. The safest failure mode, in case of malfunction of a tag axle steering system, is generally considered to be locking the tag axle wheels in the neutral position. However, it may be difficult, or even impossible, to move the tag axle wheels to the neutral position from the position they are in when the malfunction occurs. Therefore, some other type of action should be taken in order to avoid unsafe behavior of the vehicle, if a fault signal indicating malfunction of the tag axle steering system would be generated. In accordance with the present method, this action is to lock the tag axle wheels in the current position. By locking the tag axle wheels in said current position, there is no risk of an unwanted oversteering behavior of the vehicle. More specifically, it has surprisingly been found that when the tag axle wheels are locked in said position, there will be essentially no lateral acceleration of the tag axle.

The method may further comprise a step of, when it is determined that a predefined condition is fulfilled while the position of the tag axle wheels is locked at said current steering angle of the tag axle wheels, releasing the tag axle wheels to a caster steer mode. When in caster steer mode, the tag axle wheels are no longer locked in position, but are able to turn such that the steering angle of the tag axle wheels is altered. Thereby, it may be avoided that the back of the vehicle will get a skew and take up more road space than necessary. Furthermore, releasing to caster steer mode under these conditions may reduce tyre wear which may result from the tag axle wheels being locked in a non-neutral position when the vehicle travels straight forward. The predefined condition may according to one alternative relate to the lateral acceleration of the tag axle. For example, if the lateral acceleration of the tag axle would be predicted to be below a predetermined value in case the tag axle wheels would be released to caster steer mode, then the tag axle wheels may be released to said caster steer mode. Thus, determining whether the predefined condition is fulfilled may comprise predicting the lateral acceleration of the tag axle if released to caster steer mode.

Alternatively, the predefined condition (to be fulfilled for releasing the tag axle wheels to caster steer mode) may be that at least one parameter, obtained from the front axle steering system and/or sensors of the wheels of the vehicle, fulfils a predefined criterion for said predefined parameter. The predefined condition may be related to determining how much a driver (or a steering system of an autonomous vehicle) seeks to turn the vehicle and/or how much the vehicle is turning. The predefined parameter may for example be a parameter reflecting the steering angle, or rate of change of the steering angle, of the front wheels of the vehicle. If so, the predefined criterion may be the predefined parameter reflecting that the steering angle, or rate of change of the steering angle, of the front wheels is within a predefined interval. The predefined interval for the steering angle of the front wheels is typically an interval defined by the steering angle that represents the position where the front wheels are aligned with the longitudinal extension of the vehicle (usually called a steering angle of 0°)±a predefined number of degrees. The predefined interval for the steering angle of the front wheels may for example be from −5° to +5° (including the end values of the range) when 0° represents a steering angle at which the front wheels are aligned with the longitudinal extension of the vehicle. The predetermined parameter may for example be a steering wheel angle, a steering wheel angular velocity, a steering column torque, a rate of change of steering column torque, or a steering angle of the front wheels, but is not limited thereto. Determining how much the vehicle is turning may also be made by considering a potential difference in rotational speed between the wheels of a wheel pair of the vehicle, such as a difference in rotational speed of for example the front wheels of the vehicle. For said purpose, wheels sensors configured to determine the rotational speeds of the respective wheels may be used. In case there is a difference in rotational speed between the wheels of the wheel pair, then said wheels are not aligned with the longitudinal extension of the vehicle and the vehicle is thus turning.

The method may further comprise a step of, in response to a determination that the steering angle of tag axle wheels have reached the steering angle of the neutral position while the tag axle wheels are in caster steer mode, locking the position of tag axle wheels in the neutral position. As previously mentioned, having the tag axle wheel locked in the neutral position is generally considered to be the safest failure mode in case of malfunction of the tag axle steering system. The tag axle wheels may thereafter, if desired, be maintained locked in the neutral position until a check and/or repair of the tag axle steering system has been performed. In other words, the tag axle steering system may remain in a failure mode defined by the present method until a check and/or repair of the tag axle steering system has been performed.

The method may further comprise a step of generating a warning message or signal, for example to a driver of the vehicle or to a remote control center, informing of the malfunction of the tag axle steering system and/or the control device controlling the tag axle steering system in a failure mode. Thereby, a notification of need to check and/or repair the tag axle steering system is generated. It should here be noted that the method may comprise controlling the tag axle steering system in failure mode until such a check and/or repair has been made at for example a workshop.

The above described above may be used with any type of previously known tag axle steering system, but would in practice probably be most useful if the tag axle steering system is an electrohydraulic tag axle steering system or an electric tag axle steering system. The tag axle steering system may be a steer-by-wire tag axle steering system. One example of an electrohydraulic tag axle steering system wherein the present method may be used is described in the previously mentioned WO 2014/163560 A1.

The performance of the method for controlling a tag axle steering system as disclosed herein may be governed by programmed instructions. These programmed instructions typically take the form of a computer program which, when executed in or by a control device, causes the control device to effect desired forms of control action. Such instructions may typically be stored on a computer-readable medium.

Furthermore, the present disclosure provides a control device configured to perform the above-described method for controlling a tag axle steering system. The control device may be configured to perform any one of the steps of the method for controlling a tag axle steering system as described herein.

More specifically, the present disclosure provides a control device configured to control a tag axle steering system. Said tag axle steering system is configured to steer tag axle wheels of a tag axle in dependence of information obtained from a front axle steering system of a vehicle, wherein said front axle steering system is configured to steer front wheels of the vehicle. If the tag axle is arranged in an articulated vehicle, the tag axle steering system may additionally or alternatively be configured to steer the tag axle wheels of the tag axle in dependence of information obtained from an articulation control system of the vehicle, wherein said articulation control system is configured to monitor and/or control at least one articulation parameter representing an articulation state of the vehicle. The control device is configured to, when the steering angle of the tag axle wheels is offset from a steering angle of a neutral position of the tag axle wheels and in response to a fault signal indicating malfunction of the tag axle steering system, lock the position of the tag axle wheels at a current steering angle of the tag axle wheels.

The control device may comprise one or more control units. In case the control device comprises a plurality of control units, each control unit may be configured to control a certain function or a certain function may be divided between different control units. The control device may be arranged in the vehicle, and thus be a part of the vehicle. The control device may be a part of the tag axle steering system as such. Alternatively, the control device may be separate from the tag axle steering system but configured to communicate therewith for the purpose of performing various control actions.

The present disclosure further provides a vehicle comprising a steerable tag axle and the control device described above. The vehicle may for example be a land-based heavy vehicle, such as a truck, a bus, a trailer or the like.

Figure 1:
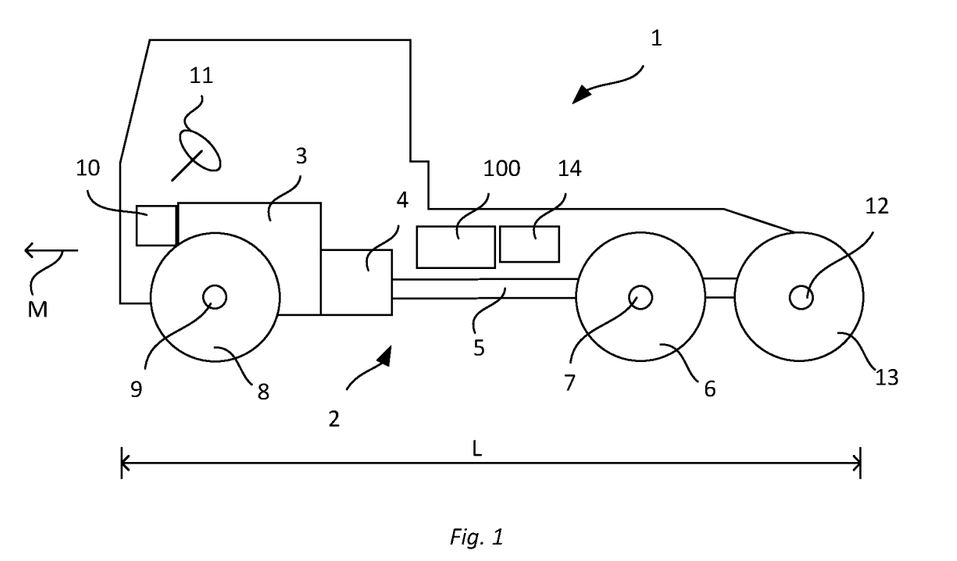
FIG. 1 schematically illustrates a side view of a first example of a vehicle.

FIG. 1 schematically illustrates a side view of a first example of a vehicle 1. The vehicle comprises a powertrain 2 including a propulsion unit, for example a combustion engine 3. The powertrain 2 may further comprise a gearbox 4 configured to transmit driving torque, at different gear ratios, from the propulsion unit to drive wheels 6 (only one shown in the figure) of the vehicle 1. The gearbox 4 may be connected to the drive wheels 6 via a propeller shaft 5 and a drive wheel shaft 7. The propeller shaft 5, the drive wheel shaft 7 and the drive wheels 6 are constituent components of the powertrain 2. The primary direction of travel of the vehicle 1, i.e. the direction when the vehicle is travelling forward, is in the figure illustrated by the arrow M. The vehicle 1 has a longitudinal extension L as illustrated in the figure.

The vehicle 1 further comprises a front wheel axle 9 and front wheels 8. The front wheels 8 are steered wheels. The vehicle comprises a front axle steering system 10 configured to control the steering of the front wheels 8. The vehicle 1 may further comprise a steering wheel 11. The steering wheel 11 may be operated by a driver of the vehicle 1 for the purpose of steering the vehicle.

The vehicle 1 may further comprise a tag axle 12 with associated tag axle wheels 13. The tag axle 12 with the tag axle wheels 13 are not a part of the powertrain, and the tag axle wheels 13 are thus non-driven wheels. The tag axle wheels 13 may be steerable via a tag axle steering system 14. The tag axle steering system 14 may be configured to steer the tag axle wheels 13 in dependence of information obtained from the front axle steering system 10. The vehicle 1 may further comprise a control device 100 configured to control the tag axle steering system 14.

The vehicle 1 may be a heavy vehicle, such as a truck or a bus. Furthermore, the vehicle may be a hybrid vehicle, in which case the vehicle further comprises an electric machine (not shown) in addition to the combustion engine 2. Alternatively, the vehicle may be a fully electric vehicle in which case the vehicle does not comprise the combustion engine 3 illustrated, but only an electric machine. Moreover, the vehicle 1 may be a manually driven vehicle, a partly autonomous vehicle, or a fully autonomous vehicle.

Figure 2:
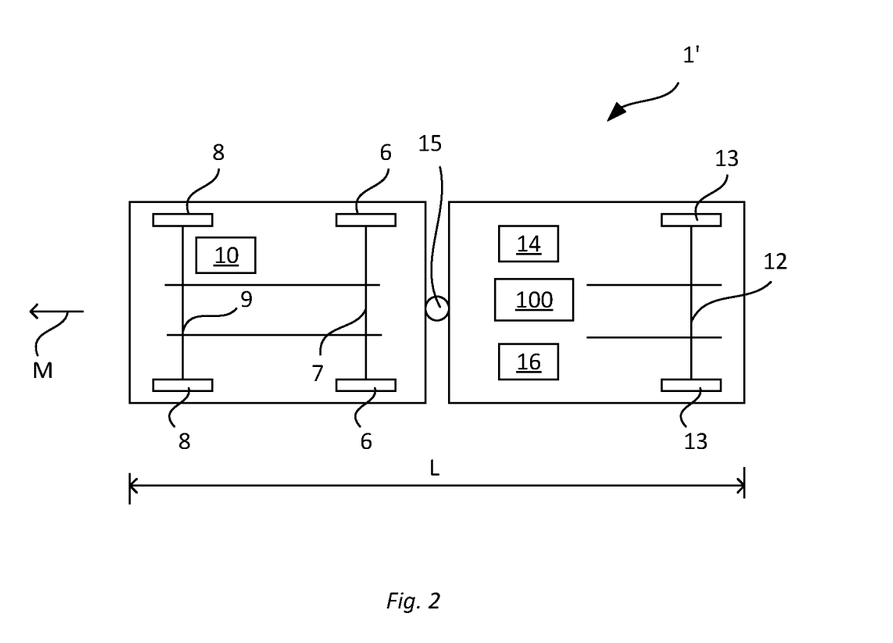
FIG. 2 schematically illustrates a top view of a second example of a vehicle.

FIG. 2 schematically illustrates a top view of a second example of a vehicle, here in the form of an articulated vehicle 1'. Like the vehicle 1 shown in FIG. 1, the vehicle 1' comprises a front wheel axle 9 with associated front wheels 8, a front axle steering system 10 configured to control the steering of the front wheels 8, a drive wheel shaft 7 with associated the drive wheels 6, and a tag axle 12 with associated tag axle wheels 13. The vehicle 1' further comprises an articulation joint 15 and an articulation control system 16. The articulation control system 16 is configured to control the articulation joint, for example in dependence of information obtained from the front axle steering system 10 and/or various sensors or controllers of the vehicle indicating an articulation state of the vehicle. For example, the articulation control system 16 may be configured to control an articulation angle of the articulation joint 15.

The vehicle 1' further comprises a tag axle steering system 14 and a control device 100 configured to control the tag axle steering system. The tag axle steering system 14 may be configured to steer the tag axle wheels in dependence of information obtained from the articulation control system 16. The tag axle steering system 14 may also, if desired, be configured to steer the tag axle wheels in dependence of information obtained from the front axle steering system 10.

It should be noted that the vehicle 1 shown in FIG. 1 and the vehicle 1' shown in FIG. 2 are merely for illustrative purposes, and the present invention is not limited to the vehicles shown or to the position of the tag axle 12 within said vehicles. A tag axle is however arranged behind the front axle when seen in the primary direction of travel of the vehicle.

Figure 3A:
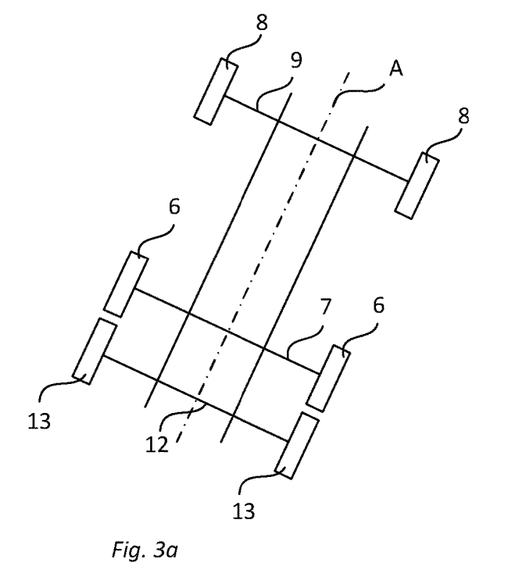
FIG. 3a schematically represents a top view of wheel axles of a vehicle showing the tag axle wheels in a neutral position, FIG. 3b schematically represents a top view of wheel axles of a vehicle showing the tag axle wheels when the tag axle wheels are steered and in a position other than the neutral position, FIG. 3c schematically represents a top view of wheel axles of a vehicle showing the tag axle wheels when released to caster steer mode.

FIG. 3a schematically represents a top view of the wheel axles 9, 7, 12 of a vehicle (for example the vehicle 1 shown in FIG. 1) showing the tag axle wheels 13 in a neutral position. As evident from the figure, the tag axles wheels 13, when in the neutral position, are arranged so that their rotational axis (which also coincides with a longitudinal axis of the tag axle 12) is essentially perpendicular to a central axis A of the vehicle. Described differently, the tag axle wheels are, when in the neutral position, essentially aligned with the longitudinal axis A of the vehicle. In the figure, the front wheels 8 are also shown to be arranged essentially aligned with the longitudinal axis A. The position of the tag axle wheels 13 and the front wheels 8 shown in FIG. 3a may typically occur when the vehicle is not turning, but travelling straight forward. If the vehicle speed is above a threshold speed under which a tag axle steering system is allowed to be used for safety purposes, the tag axle wheels may held in this neutral position and the tag axle steering system deactivated. Furthermore, if a malfunction of the tag axle steering system occurs when the tag axle wheels are in the neutral position shown in FIG. 3a, the tag axle wheels 13 may be locked in this position, since it is considered to be the safest position, until the tag axle steering system may be checked at a workshop or the like.

Figure 3B:
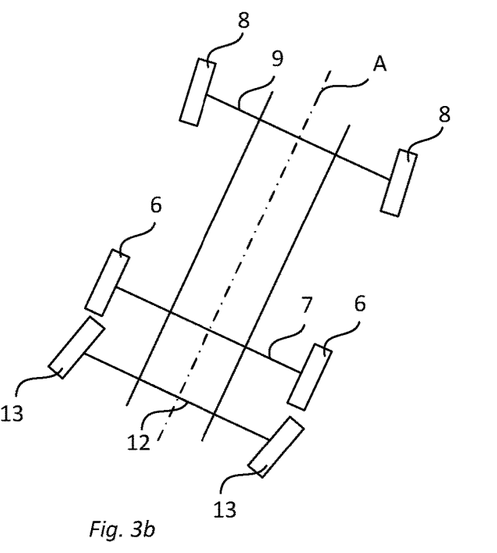

FIG. 3b schematically represents a top view of the wheel axles 9, 7, 12 showing the tag axle wheels 13 in a position other than the neutral position. In other words, the steering angle of the tag axle wheels 13 is here offset from a steering angle of the neutral position of the tag axle wheels. More specifically, the tag axle wheels are steered by the tag axle steering system for example in dependence of information obtained from a front axle steering system. As shown in FIG. 3b, the front wheels 8 are also turned (by the front axle steering system) from a position in which they are aligned with the longitudinal axis A of the vehicle. The illustrated situation may typically occur when the vehicle is turning. If a fault signal indicating malfunction of the tag axle steering system occurs when the tag axle wheels are arranged as exemplified in FIG. 3b, the tag axle wheels 13 are in accordance with the present method locked in the current position. In other words, the position of the tag axle wheels are in such a situation locked at the current steering angle of the tag axle wheels. Locking the tag axle wheels in this position significantly reduces the risk of an unwanted oversteer behavior of the vehicle.

Figure 3C:
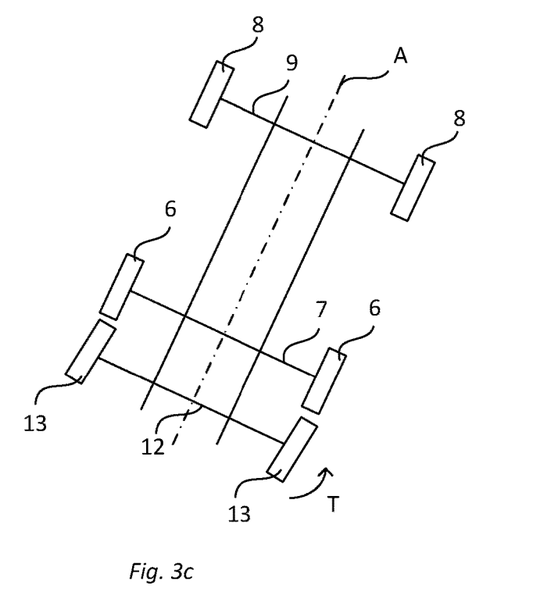

FIG. 3b schematically represents a top view of the wheel axles 9, 7, 12 showing the tag axle wheels 13 when released to caster steer mode. In other words, the tag axle wheels 13 are not locked in any position and may therefore turn as a result of the forces to which they are subjected as a result of the movement of the vehicle. Moreover, the front wheels 8 are here shown to be essentially aligned with the longitudinal axis A of the vehicle. This may for example indicate that a driver of the vehicle intends to drive the vehicle straight forward, i.e. not to turn. A caster steer mode may be utilized in case a malfunction of the tag axle steering system would occur and allows the tag axle wheels to straighten up, when the vehicle travels straight forward, so that the steering angle of the tag axle wheels approaches the steering angle of the neutral position (compare with FIG. 3a). This is illustrated in FIG. 3c by the arrow T. A caster steer mode may for example be advantageous if the vehicle is not turning and/or when the steering angle of the tag axle wheels is only slightly offset from the steering angle of the neutral position of the tag axle wheels.

Figure 4:
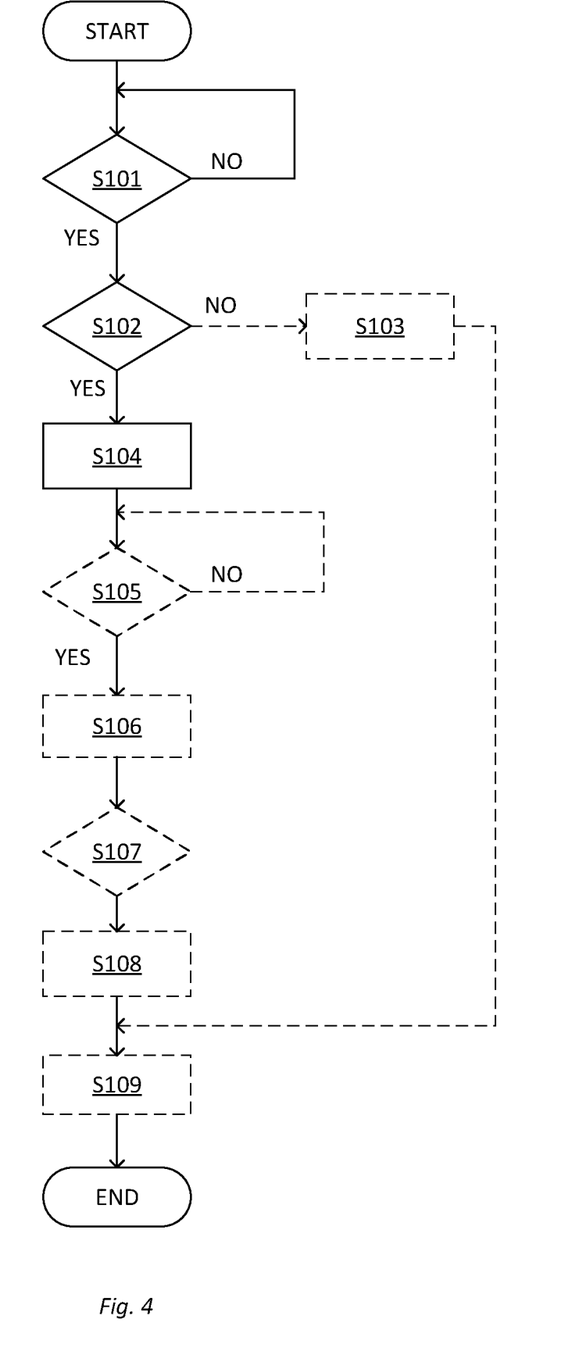
FIG. 4 represents a flowchart schematically illustrating one exemplifying embodiment of the method for controlling a tag axle steering system in accordance with the present disclosure, FIG. 5 schematically illustrates a device that may constitute, comprise or be a part of a control device configured to control a tag axle steering system.

FIG. 4 represents a flowchart schematically illustrating one exemplifying embodiment of the method for controlling a tag axle steering system in accordance with the present disclosure. Optional steps of the exemplified embodiment are illustrated by dashed boxes.

The method may comprise a first step S101 of determining whether a fault signal indicating malfunction of the tag axle steering system has been generated. If no such fault signal has been generated, the method may be returned to start. If a fault signal indicating malfunction of the tag axle steering system has been generated, the method may proceed to step S102.

Step S102 comprises determining whether the (current) steering angle of the tag axle wheels is offset from a steering angle of a neutral position of the tag axle wheels. If the current steering angle of the tag axle wheels is not offset from the steering angle of a neutral position of the tag axle wheels, the method may proceed to a step S103 of locking the tag axle wheels in the neutral position. After step S103, the method may proceed to the optional step S109 (which will be described below) and/or ended. However, if the steering angle of the tag axle wheels is offset from the steering angle of the neutral position of the tag axle wheels, the method proceeds to step S104. Step S104 comprises locking the position of the tag axle wheels at the current steering angle of the tag axle wheels.

After step S104, the method may comprise a step S105 of determining whether a predefined condition is fulfilled while the position of the tag axle wheels is locked at said current steering angle (i.e. in a position other than the neutral position). If said predefined condition is not fulfilled, the method may be returned to prior to step S105. In other words, the locked position of the tag axle wheels is maintained, and it is continuously or repeatedly determined whether the predefined condition is fulfilled. However, if it, in step S105, is determined that the predefined condition is fulfilled, the method may proceed to step S106. Step S106 comprises releasing the tag axle wheels to a caster steer mode. Thereby, the position of the tag axle wheels will no longer be locked, and the tag axle wheels are therefore free turn in response to the lateral forces to which they are subjected as a result of the movement of the vehicle. This will allow the tag axle wheels to straighten up so as to align with the longitudinal extension of the vehicle when the vehicle is travelling straight forward.

The method may further comprise a step S107 of determining whether the steering angle of the tag axle wheels, while in caster steer mode, have reached a steering angle of the neutral position. If it is determined that the steering angle of the tag axle wheels have reached the steering angle of the neutral position, the method may proceed to step S108. Step S108 comprises locking the position of the tag axle wheels in the neutral position.

The method may further comprise a step S109 of generating a warning, for example to alert a driver of the vehicle or a remote control center, informing of the malfunction of the tag axle steering system. Although step S109 is illustrated as being performed after step S108, it may be performed at any point in time of the method after it is determined in step S101 that a fault signal indicating malfunction of the tag axle steering system has been generated.

Thereafter, the method may be ended, as also illustrated in FIG. 3. For example, in case step S103 or step S109 has been performed, the method may be ended with the tag axle wheels locked in the neutral position.

Figure 5:
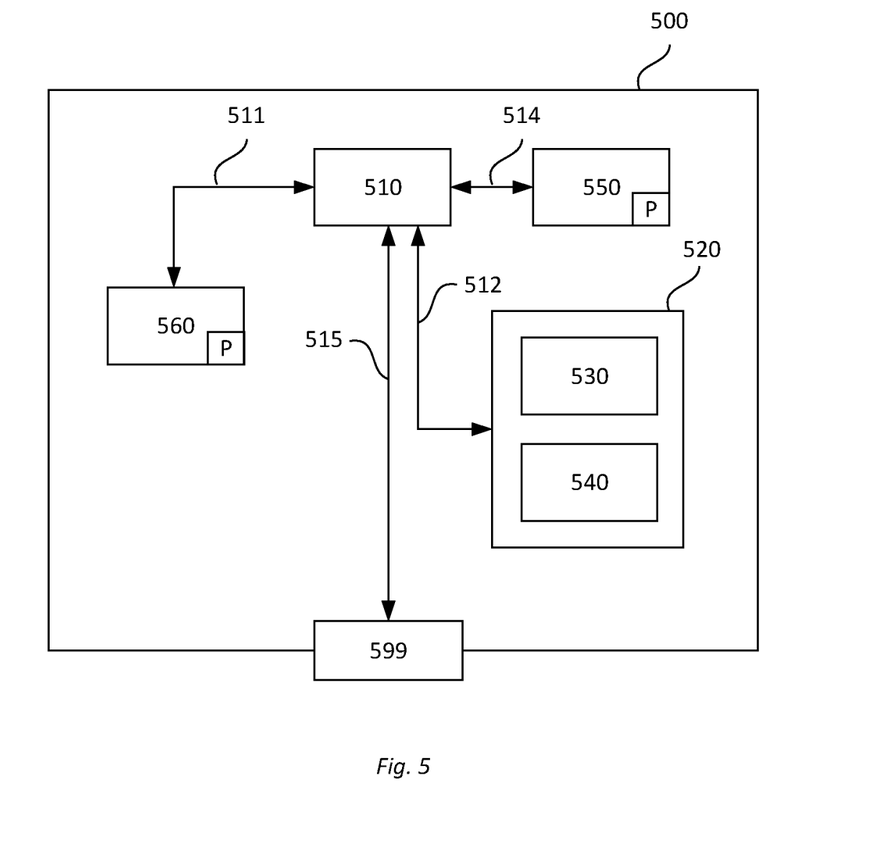

FIG. 5 schematically illustrates an exemplifying embodiment of a device 500. The control device 100 described above may for example comprise the device 500, consist of the device 500, or be comprised in the device 500.

The device 500 comprises a non-volatile memory 520, a data processing unit 510 and a read/write memory 550. The non-volatile memory 520 has a first memory element 530 in which a computer program, e.g. an operating system, is stored for controlling the function of the device 500. The device 500 further comprises a bus controller, a serial communication port, I/O means, an A/D converter, a time and date input and transfer unit, an event counter and an interruption controller (not depicted). The non-volatile memory 520 has also a second memory element 540.

There is provided a computer program P that comprises instructions for controlling a tag axle steering system. Said tag axle steering system is configured to steer tag axle wheels of a tag axle in dependence of information obtained from a front axle steering system of a vehicle, said front axle steering system being configured to steer front wheels of the vehicle. The computer program comprises instructions for, when a steering angle of the tag axle wheels is offset from a steering angle of a neutral position of the tag wheels and in response to a fault signal indicating malfunction of the tag axle steering system, locking the position of the tag axle wheels at a current steering angle of the tag axle wheels.

The program P may be stored in an executable form or in a compressed form in a memory 560 and/or in a read/write memory 550.

The data processing unit 510 may perform one or more functions, i.e. the data processing unit 510 may effect a certain part of the program P stored in the memory 560 or a certain part of the program P stored in the read/write memory 550.

The data processing device 510 can communicate with a data port 599 via a data bus 515. The non-volatile memory 520 is intended for communication with the data processing unit 510 via a data bus 512. The separate memory 560 is intended to communicate with the data processing unit 510 via a data bus 511. The read/write memory 550 is adapted to communicate with the data processing unit 510 via a data bus 514. The communication between the constituent components may be implemented by a communication link. A communication link may be a physical connection such as an optoelectronic communication line, or a non-physical connection such as a wireless connection, e.g. a radio link or microwave link.

When data are received on the data port 599, they may be stored temporarily in the second memory element 540. When input data received have been temporarily stored, the data processing unit 510 is prepared to effect code execution as described above.

Parts of the methods herein described may be affected by the device 500 by means of the data processing unit 510 which runs the program stored in the memory 560 or the read/write memory 550. When the device 500 runs the program, methods herein described are executed.

The invention claimed is:

1. A method, performed by a control device, for controlling a tag axle steering system, said tag axle steering system being configured to steer tag axle wheels of a tag axle in dependence of information obtained from a front axle steering system of a vehicle and/or an articulation control system of the vehicle, wherein said front axle steering system is configured to steer front wheels of the vehicle, and wherein said articulation control system is configured to monitor and/or control at least one articulation parameter representing an articulation state of the vehicle, the method comprising:
determining that a steering angle of the tag axle wheels is offset from a steering angle of a neutral position of the tag axle wheels and that a fault signal indicates a malfunction of the tag axle steering system;
in response thereto, locking the position of the tag axle wheels at a current steering angle of the tag axle wheels;
determining that a predefined condition is fulfilled while the position of the tag axle wheels is locked at said current steering angle of the tag axle wheels; and in response thereto, releasing the tag axle wheels to a caster steer mode.

2. The method according to claim 1, further comprising:
in response to a determination that the steering angle of tag axle wheels have reached a steering angle of the neutral position while the tag axle wheels are in caster steer mode, locking the position of tag axle wheels in the neutral position.

3. The method according to claim 1, wherein the predefined condition is that at least one predefined parameter, obtained from the front axle steering system of the vehicle and/or sensors of wheels of the vehicle, fulfils a predefined criterion for said predefined parameter.

4. The method according to claim 3, wherein
the predefined parameter is a parameter reflecting the steering angle, or rate of change of the steering angle, of the front wheels; and
the predefined criterion is that the predefined parameter reflects that the steering angle, or rate of change of the steering angle, of the front wheels is within a predefined interval.

5. The method according to claim 4, wherein the predefined parameter is a steering wheel angle, a steering wheel angular velocity, a steering column torque, a rate of change of steering column torque, a steering angle of the front wheels, or a difference in rotational speed between wheels of a wheel pair of the vehicle.

6. The method according to claim 1, wherein locking the position of the tag axle wheels at the current steering angle of the tag axle wheels is performed when the steering angle of the tag axle wheels is offset from the steering angle of a neutral position of the tag axle wheels by a value exceeding a predefined threshold value.

7. The method according to claim 1, wherein the neutral position of the tag axle wheels corresponds to a position wherein the tag axle wheels are considered to be aligned with a longitudinal axis of the vehicle.

8. The method according to claim 1, wherein the tag axle steering system is an electrohydraulic tag axle steering system or an electric tag axle steering system.

9. A computer program product for controlling a tag axle steering system, the computer program product comprising a non-transitory computer-readable medium comprising instructions which, when executed by a control device, cause the control device to:
determining that a steering angle of the tag axle wheels is offset from a steering angle of a neutral position of the tag axle wheels and that a fault signal indicates a malfunction of the tag axle steering system;
in response thereto, locking the position of the tag axle wheels at a current steering angle of the tag axle wheels;
determining that a predefined condition is fulfilled while the position of the tag axle wheels is locked at said current steering angle of the tag axle wheels; and
in response thereto, releasing the tag axle wheels to a caster steer mode.

10. A control device configured to control a tag axle steering system, wherein the control device is configured to:
determining that a steering angle of the tag axle wheels is offset from a steering angle of a neutral position of the tag axle wheels and that a fault signal indicates a malfunction of the tag axle steering system;
in response thereto, locking the position of the tag axle wheels at a current steering angle of the tag axle wheels;
determining that a predefined condition is fulfilled while the position of the tag axle wheels is locked at said current steering angle of the tag axle wheels; and
in response thereto, releasing the tag axle wheels to a caster steer mode.

11. The control device according to claim 10, further configured to:
lock the tag axle wheels in the neutral position in response to a determination that the steering angle of tag axle wheels have reached a steering angle of the neutral position while the tag axle wheels are in caster steer mode.

12. A vehicle comprising:
a tag axle steering system configured to steer tag axle wheels of a tag axle of the vehicle, said tag axle steering system being configured to steer tag axle wheels of a tag axle in dependence of information obtained from a front axle steering system of a vehicle and/or an articulation control system of the vehicle, wherein said front axle steering system is configured to steer front wheels of the vehicle, and wherein said articulation control system is configured to monitor and/or control at least one articulation parameter representing an articulation state of the vehicle; and
a control device in communication with the tag axle steering system, wherein the control device is configured to:
determining that a steering angle of the tag axle wheels is offset from a steering angle of a neutral position of the tag axle wheels and that a fault signal indicates a malfunction of the tag axle steering system;
in response thereto, locking the position of the tag axle wheels at a current steering angle of the tag axle wheels;
determining that a predefined condition is fulfilled while the position of the tag axle wheels is locked at said current steering angle of the tag axle wheels; and
in response thereto, releasing the tag axle wheels to a caster steer mode.

13. A method performed by a control device, for controlling a tag axle steering system, said tag axle steering system being configured to steer tag axle wheels of a tag axle in dependence of information obtained from a front axle steering system of a vehicle and/or an articulation control system of the vehicle, wherein said front axle steering system is configured to steer front wheels of the vehicle, and wherein said articulation control system is configured to monitor and/or control at least one articulation parameter representing an articulation state of the vehicle, the method comprising:
determining that a steering angle of the tag axle wheels is offset from a steering angle of a neutral position of the tag axle wheels by a value exceeding a predefined threshold value and that a fault signal indicates a malfunction of the tag axle steering system; and
in response thereto, locking the position of the tag axle wheels at a current steering angle of the tag axle wheels.

* * * * *